United States Patent [19]

Ando et al.

[11] Patent Number: 5,058,096

[45] Date of Patent: Oct. 15, 1991

[54] DISK RECORDING/REPRODUCING APPARATUS AND DISK RECORDING/REPRODUCING METHOD

[75] Inventors: Ryo Ando, Tokyo; Tadao Yoshida, Kanagawa, both of Japan

[73] Assignee: Sony Corporation, Tokyo, Japan

[21] Appl. No.: 274,940

[22] PCT Filed: Mar. 10, 1988

[86] PCT No.: PCT/JP88/00253

§ 371 Date: Nov. 9, 1988

§ 102(e) Date: Nov. 9, 1988

[87] PCT Pub. No.: WO88/07254

PCT Pub. Date: Sep. 22, 1988

[30] Foreign Application Priority Data

Mar. 13, 1987 [JP] Japan .................................. 62-56909

[51] Int. Cl.⁵ .......................... G11B 15/04; G11B 7/00
[52] U.S. Cl. ...................................... 369/100; 369/53; 360/60; 360/72.1
[58] Field of Search ........................... 369/100, 53–58, 369/60, 275.1, 275.2, 275.3, 30, 32, 47, 48, 49; 360/72.1, 72.2, 60

[56] References Cited

U.S. PATENT DOCUMENTS 4,545,044 10/1985 Satoh ................................. 369/58 X
4,554,651 11/1985 Kanai et al. ..................... 369/110 X
4,686,587 8/1987 Hipp ................................. 369/27 X
4,688,117 8/1957 Dwyer ............................. 369/27 X
4,760,566 7/1988 Kobayashi ....................... 369/59 X

FOREIGN PATENT DOCUMENTS 50-29468 8/1975 Japan .
59-163660 9/1984 Japan .
59-175064 10/1984 Japan .

Primary Examiner—Roy N. Envall, Jr.
Assistant Examiner—Hung Bui
Attorney, Agent, or Firm—Philip M. Shaw, Jr.

[57] ABSTRACT

A disk recording/reproducing apparatus and a disk recording/reproducing method wherein a recording disk (1) having an absolute address is provided with a program region (6) and a read-in region (7), data such as play data are recorded on the program region (6), the data are recorded on the read-in region (7) using, as catalog data, a start address data of a data unit region where the data have been recorded and a finish address data, and the data on the program region (6) are reproduced from the catalog data in the read-in region (7). An erase inhibit flag is set to the catalog data for each of the data units, whereby the erase inhibit and the erase enable are designated by the erase inhibit flag for each of the data units for the data that are recorded on the program region (6).

9 Claims, 6 Drawing Sheets

CONSTRUCTION OF A DISK RECORDING/REPRODUCING APPARATUS

RECORDING FORMAT OF RECORDING DISK

CONSTRUCTION OF A DISK RECORDING/REPRODUCING APPARATUS

FUNCTIONAL CONSTRUCTION
OF A MICRO-COMPUTER

SET UP MODE OPERATION

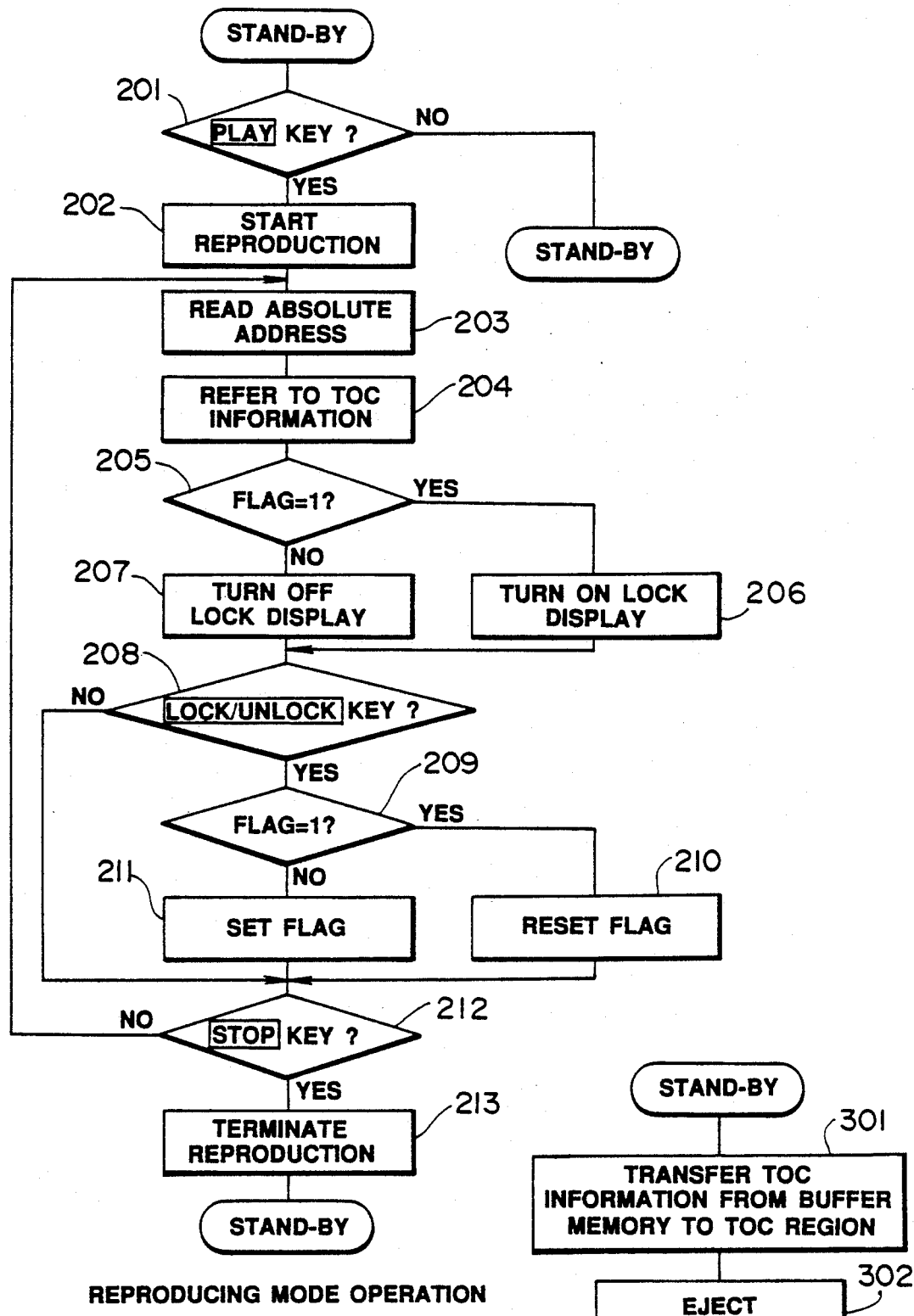

RECORDING MODE OPERATION

DISK RECORDING/REPRODUCING APPARATUS AND DISK RECORDING/REPRODUCING METHOD

TECHNICAL FIELD

This invention relates to a disk recording/reproducing apparatus and a disk recording/reproducing method for recording data, such as the information on a (musical play or performance, on a recording disk, to which absolute addresses have been imparted in advance. It is applicable for instance to a performance device for a compact disk (CD) adapted for both recording and reproduction.

BACKGROUND ART

There has so far been marketed a disk player device dedicated to reproduction, such as a CD player designed to reproduce a so-called compact disk (CD), which is an optical disk on which audio signals such as the voice or musical sounds are recorded in the digitized form. While the conventional CD player is dedicated to reproduction, attempts have been made to develop a disk system which, through the use of a magneto-optical disk formed by a photo-magnetic recording medium allowing to rewriting of the information, is adapted for both recording and reproduction and for maintaining compatibility with respect to the compact disk. All the numbers or tunes on the compact disk are recorded end to end, such that the CD player continues its reproducing operation after a given number has been reproduced to proceed continuously to reproduce the next number.

As shown diagrammatically in FIG. 1, the recording disk 1 employed in the above disk system is formed with spirally extending pregrooves 2 each having a depth equal to $\lambda/8$, wherein $\lambda$ indicates the wavelength of the laser beam used for information recording. On a land 3 between the adjacent pregrooves 2, a prerecorded region 4 in which patterns of projections and recesses formed by pits each $\lambda/4$ in depth are previously recorded and a data recording region 5 in which magneto-optical recording is performed, are formed alternately in the circumferential direction, each at an equal pitch. A lead-in region 7 is provided at the inner periphery of the program region 6 in which the performance or play information is recorded. In this lead-in region, there is recorded a table of contents (TOC) information or catalog information indicating the record contents of the program region 6. In the prerecorded region 4 of the recording disk 1, there are recorded 24 bits of sync signals and 14 bits or 1 symbol of subcodes as patterns of projections and recesses formed in advance by a molding operation as indicated in FIG. 3. These subcodes represent the absolute time information or absolute addresses from the start position of the program region 6. The above 24 bit sync signals and 14 bit subcodes are a part of the 588 channel bit data making up one frame of the data format, as shown in FIG. 2, standardized for the compact disk (CD), and including, in addition to the above sync signals and subcodes, $14 \times 32$ bits (32 symbols) of the data such as the performance information and parities and margin bits, each of 3 bits, provided between adjacent symbols.

In a disk system employing the above described recording disk 1, disk rotation control etc. is performed at a constant linear velocity (CLV), using the aforementioned absolute addresses reproduced from the prerecorded region 4 of the recordable disk 1, so that the information is recorded in the data format standardized for the compact disk (CD).

It will be noted that, with the disk system adapted for both recording and reproduction and for maintaining superior compatibility with respect to the compact disk (CD), there is the risk that the play information previously recorded on the program region of the recording disk may be erased inadvertently or replaced by another play information by superscription. More in detail, in the above disk system, all of the play information is not necessarily recorded end to end on the disk, such that, when a new number is to be recorded on an unrecorded portion between first and second numbers, should the play time of the newly recorded number be longer than the recordable time for the unrecorded portion, the play data for the second number is replaced by the new play data. In the case of audio as video tape cassettes, to prevent such inadvertent erasure of the necessary data, rupturable tongues are provided to the cassett half as an inadvertent erasure inhibit means, which may be ruptured manually to inhibit recording or erasure on the tape in its entirety. However, in a disk system employing a recording disk, such as a magneto-optical disk having a larger recording capacity, should the recording or erasure of the disk be inhibited in its entirety, the risk is high that the volume of the unrecorded portion is increased, with the result that the utilization efficiency of the recordable disk is lowered.

In view of the, above problem, the present invention is aimed at providing a disk recording/reproducing apparatus and a disk recording/reproducing method in which a program region and a lead-in region are provided on a recording disk to which absolute addresses are imparted in advance, data such as play information are recorded in said program region, start address data and end address data of a unit information region in said program region having data recorded therein are recorded as table of contents data or catalog data in said lead-in region, and in which recording and/or reproduction in or from said program region is performed on the basis of said catalog data in said lead-in region, wherein the utilization efficiency of the recording disk is improved and wherein the erasure inhibit and erasure enable of each information unit of the prerecorded data in the program region may be commanded by an erasure inhibit flag.

DISCLOSURE OF THE INVENTION

For accomplishing the above object, the present invention provides a disk recording/reproducing apparatus in which a program region and a lead-in region are provided on a recording disk to which absolute addresses are imparted in advance, data such as play information are recorded in said program region, start address data and end address data of a unit information region in said program region having data recorded therein are recorded as catalog data in said lead-in region and in which recording and/or reproduction in or from said program region is performed on the basis of said catalog data in said lead-in region, wherein the improvement comprises erasure inhibit control means for performing inhibit control of an erasing operation for data previously recorded in said program region on said recording disk, in that an erasure inhibit flag is provided for each information unit in said catalog data and in that an erasure inhibit control for data previously recorded in said program region on said recording disk is performed for each information unit by said erasure inhibit control means in response to said erasure inhibit flag.

The present invention also provides, for accomplishing the above object, a disk recording/reproducing method in which a program region and a lead-in region are provided on a recording disk to which absolute addresses are imparted in advance, data such as play information are recorded in said program region, start address data and end address data of a unit information in said program region having data recorded therein are recorded as catalog data in said lead-in region and in which recording and/or reproduction in or from said program is performed on the basis of said catalog data in said lead-in region, wherein the improvement comprises setting an erasure inhibit flag for each information unit of data recorded in said program region on said recording disk as said catalog data and performing erasure control for each information unit of data previously recorded in said program region in response to said erasure inhibit flag on the basis of said catalog information reproduced from the lead-in region on said recording disk.

According to the present invention, erasure inhibit and erasure enable may be commanded by the erasure inhibit flag for each information unit of prerecorded data in the program region on a recording disk indicated by the catalog information recorded in the lead-in region on the recording disk, so that important data may be protected by the information unit basis from inadvertent erasure and the program region on the recording disk can be effectively used for data recording/reproduction.

BRIEF DESCRIPTION OF THE DRAWINGS

FIG. 6 is a flow chart showing the operation of the reproducing mode in the disk recording/reproducing apparatus.

FIG. 7 is a flow chart showing the operation of the eject mode in the disk recording/reproducing apparatus.

BEST MODE FOR PRACTICING THE INVENTION

Figure 1:
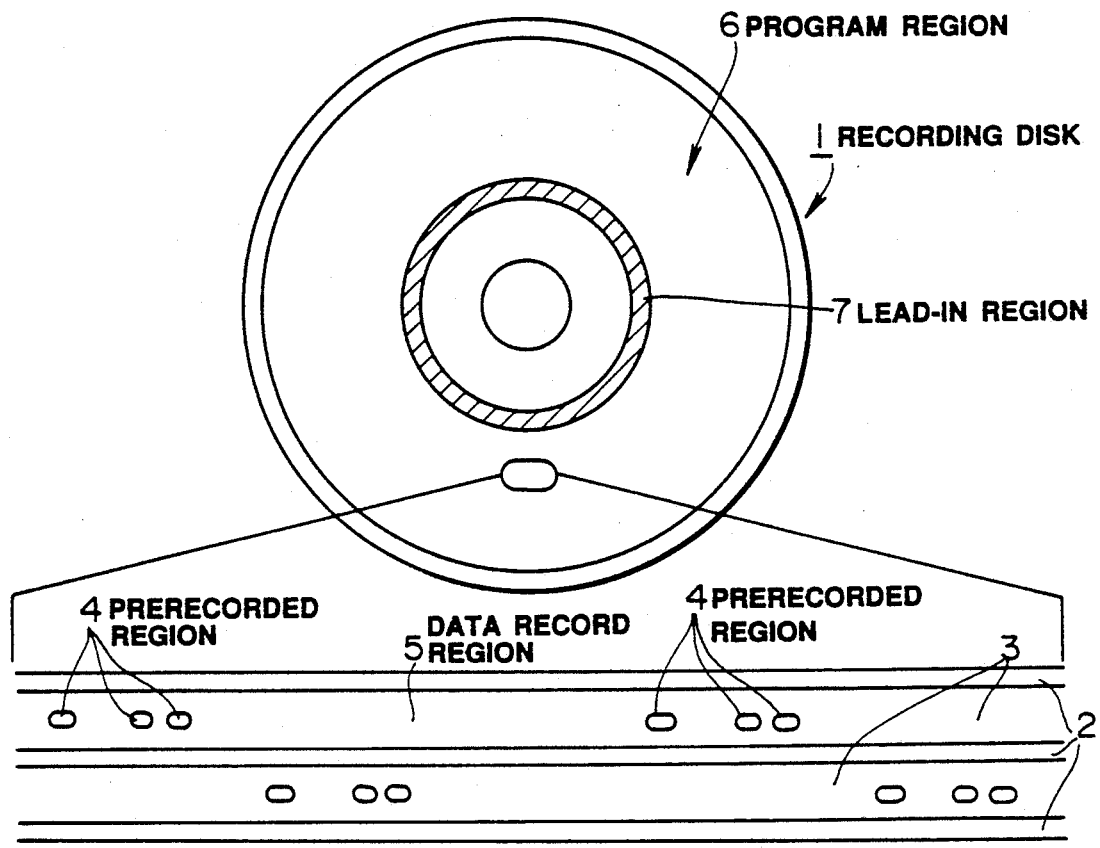
FIG. 1 is a diagrammatic view for explaining the recording format of the recording disk employed in an embodiment of the present invention.
Figure 2:
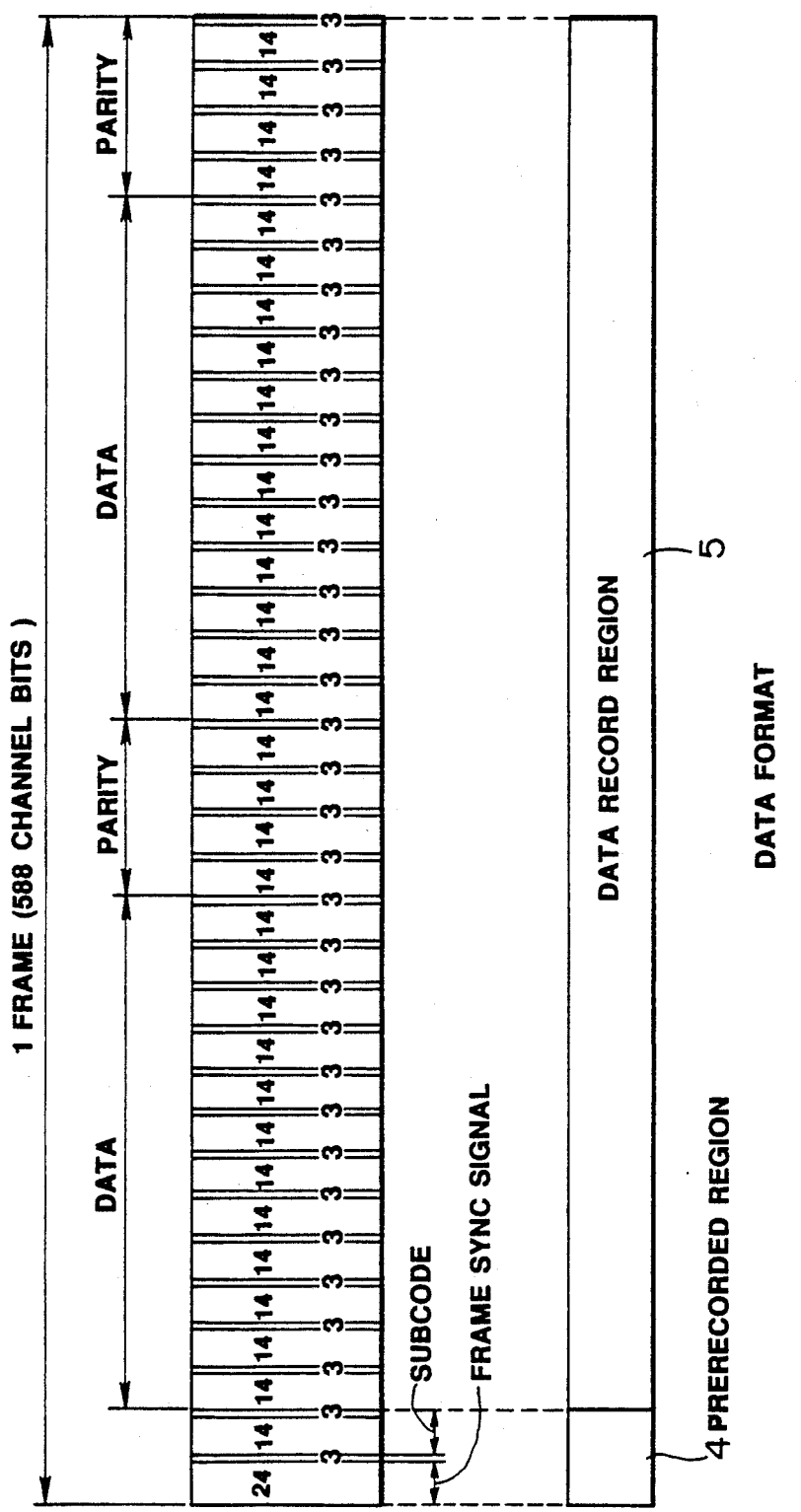
FIG. 2 is a diagrammatic view showing the data format of the information recorded on the recording disk.

In the following embodiment, the present invention is applied to a disk recording/reproducing device in which a magneto-optical disk having a perpendicular magnetizing film exhibiting magneto-optical effects is used as a recording disk 1 having the above described recording format shown in FIG. 1, and in which the recording disk 1 is driven into rotation at a constant linear velocity (CLV) for recording and/or reproducing the play or performance information having the data format standardized in the compact disk (CD) as shown in FIG. 2.

Figure 3:
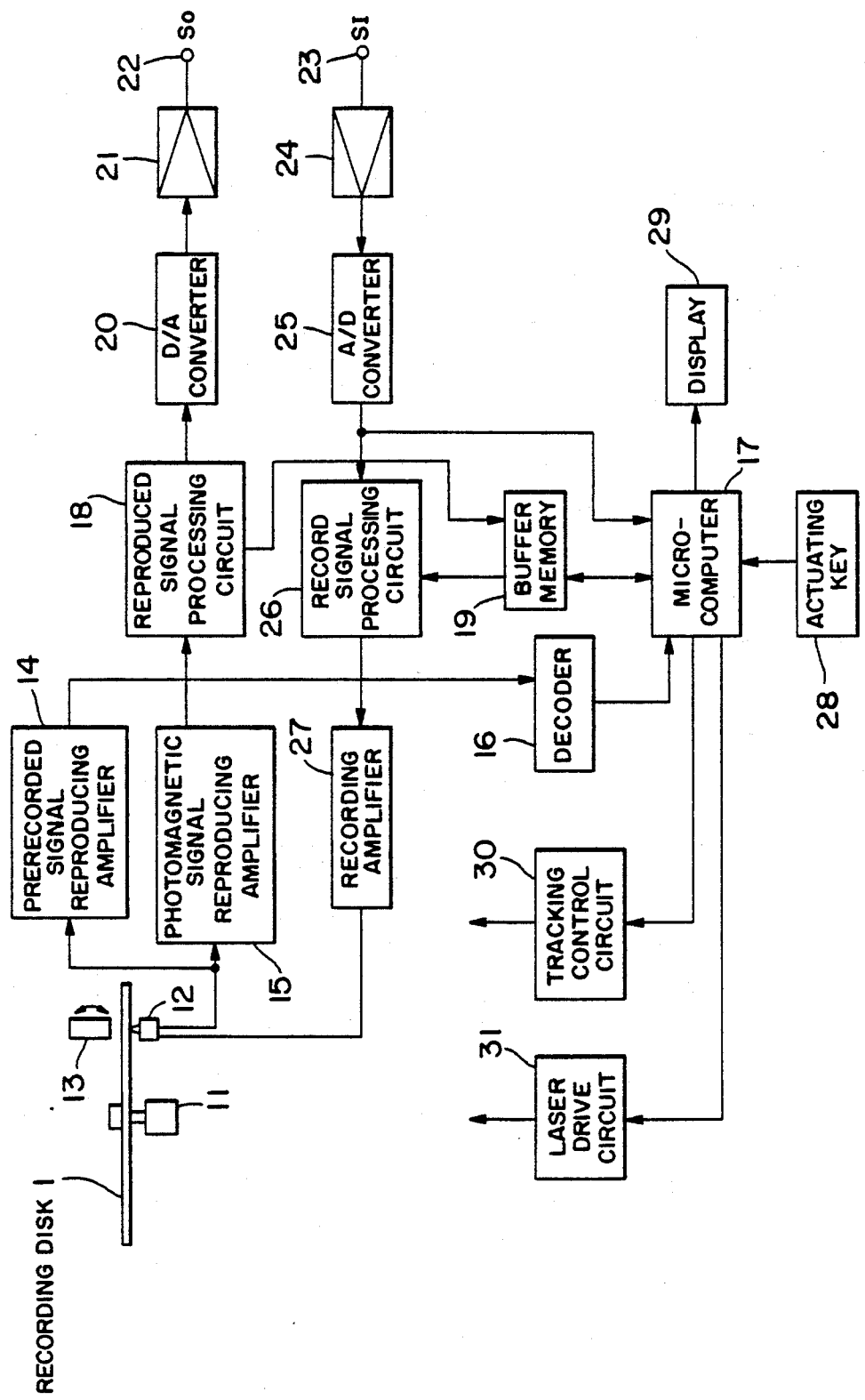
FIG. 3 is a block diagram showing the schematic arrangement of the disk recording/reproducing apparatus embodying the present invention.

Referring to the block diagram of FIG. 3, the disk recording/reproducing device includes an optical head 12 and a magnet 13, provided for facing each other on opposite sides of a recording disk 1 driven into revolutions by a disk motor 11. The optical head 12 is connected to an amplifier 14 for reproducing pre-recorded signals and to an amplifier 15 for reproducing photomagnetic signals, while also being connected to a recording amplifier 27.

The optical head 12 is composed of optical components, such as a laser diode, photodetector, lens or a beam splitter and performs the recording and/or reproduction of the information by irradiating the recordable disk 1 with a laser beam. The magnet 13 affords a magnetic field for recording or erasing the information on or from the recording disk, by taking advantage of the photo-magnetic effects. The orientation of the magnetic poles of the magnet is inverted at the time of shifting from the recording to the erasure modes and vice versa.

The optical head 12 and the magnet 13 are adapted to be moved along a radius of the disk 1 by a feed system, not shown, driven by a tracking control circuit 30. A laser diode, not shown, of the optical head 12 emits a laser light having a power proportionate to the drive current supplied from a laser drive circuit 31.

Among the reproduced RF signals read out from the recording disk 1 by the optical head 11, the reproduced signals from the prerecorded region 4 are transmitted by way of the amplifier 14 for reproducing prerecorded signals to a decoder 16. The absolute address data decoded by the decoder 16 are supplied to a micro-computer 17. The reproduced signals reproduced from a data recording region 5 on the recording disk 1 are transmitted by way of the amplifier 15 for reproducing photo-magnetic signals to a reproduced signal processing circuit 18 so as to be subjected to predetermined signal processing. The play information reproduced from the program region 6 of the recording disk 1 is transmitted by way of the reproduced signal processing circuit 18 to a digital to analog (D/A) converter 20 where it is converted into an analog form so as to be outputted at a signal output terminal 22 by way of a buffer amplifier 21 as a reproduced voice or audio signal So. The TOC information reproduced from the lead-in region 7 of the recording disk 1 is transmitted from the reproduced signal processing circuit 18 to a TOC buffer memory 19 where it is stored.

In the above described disk recording/reproducing apparatus, the voice or audio signals Si to be recorded in the program region 6 of the recording disk 1 are transmitted from a signal input terminal 23 by way of a buffer amplifier 24 to an analog to digital (A/D) converter 25 where it is digitized. The play information digitized at the A/D converter 25 is subjected to a prescribed signal processing at a recording signal processing circuit 26, after which it is transmitted by way of the recording amplifier 27 to the optical head 12 so as to be recorded in the program region 6 of the recordable disk 1.

To the micro-computer 17 are connected an actuating key 28 for entry of control data and a display 29 for display of various data. The output of the A/D converter 25 is also coupled to the micro-computer 17.

Figure 4:
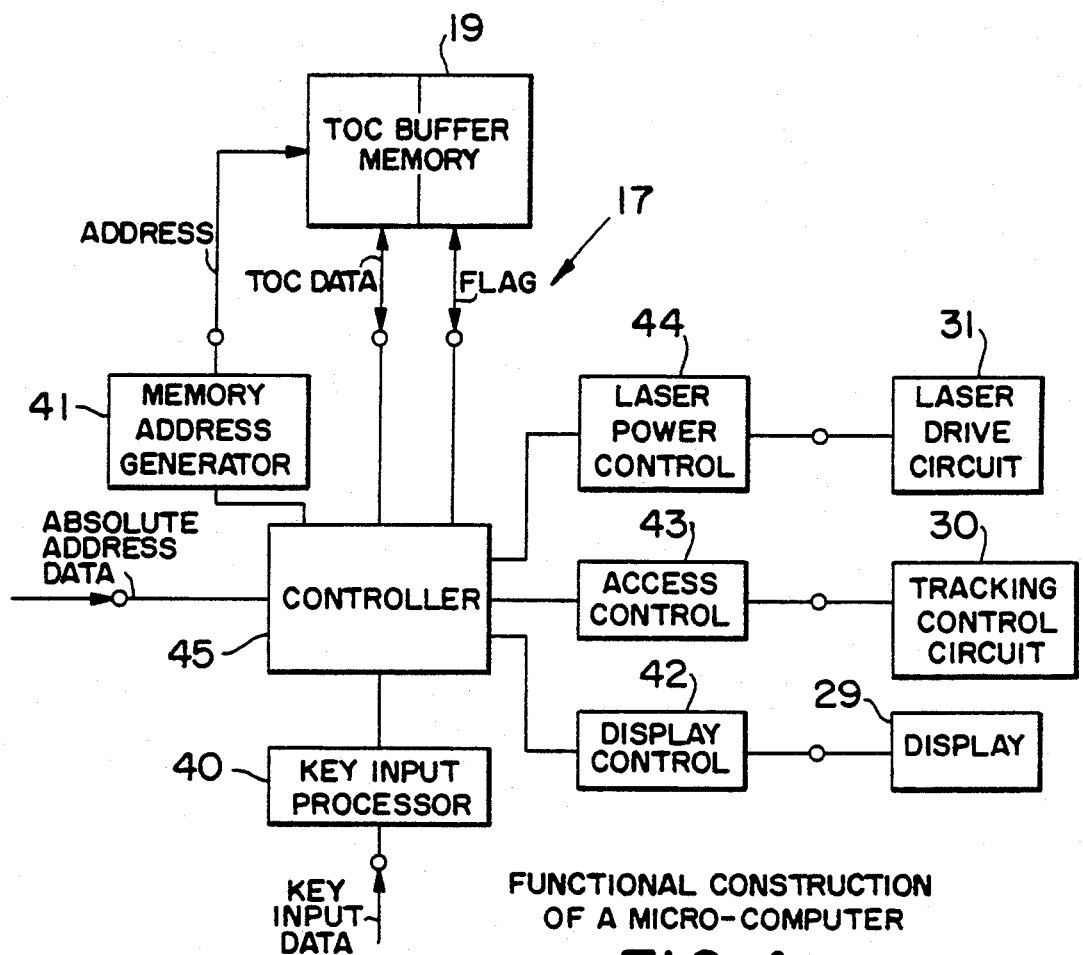
FIG. 4 is a block diagram schematically showing the essential function of a micro-computer provided in the disk recording/reproducing apparatus.

As shown functionally in the block diagram of FIG. 4, the micro-computer 17 is formed by a key input processor 40 adapted for monitoring the actuating state of the actuating key 28 and receiving the entry of control data, an address generator 41 adapted for imparting data write/read addresses for a TOC buffer memory 19, a display control 42 adapted for imparting display control signals to the display 29, an access control 43 for imparting access control signals to the tracking control 30, a laser power control 44 adapted for imparting power control signals to the laser drive control 31, and a controller 45 adapted for controlling the operations of the above operating units based on the absolute address data supplied from the decoder 16 and on the control data imparted from the key input processor 40.

Let it now be assumed that play data of 60 minutes can be recorded on the program region 6 of the recording disk 1 and that play data for four numbers or tunes have been recorded on the disk such that the performance for the first number is started at 00 minute 00 second and terminated at 05 minute 00 second; that the second number is started at 08 minute 00 second and terminated at 13 minute 00 second; that the third number is started at 15 minute 03 second and terminated at 20 minute 00 second; and that the fourth number is started at 28 minute 00 second and terminated at 36 minute 00 second. It is also assumed that, in the lead-in region 7 of the disk, there is previously recorded as the TOC information indicating the record contents of the program region 6, the TOC information indicating the prerecorded regions of the play information for the first to fourth numbers by the absolute addresses and including a flag designating the erasability of the performance information by "0", as shown in the following Table 1.

TABLE 1

| | Contents of TOC Information | | |
|---|---|---|---|
| tune number | play start time | play end time | flag |
| 1 | 00'00" | 05'00" | 0 |
| 2 | 08'00" | 13'00" | 0 |
| 3 | 15'03" | 20'00" | 0 |
| 4 | 28'00" | 36'00" | 0 |

Figure 5:
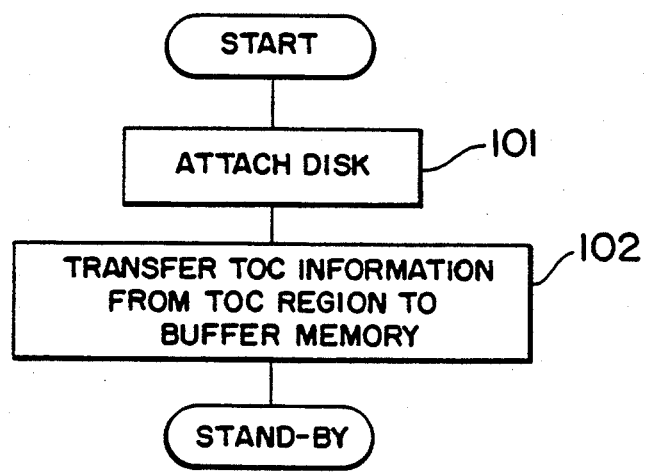
FIG. 5 is a flow chart showing the operation of the set-up mode in the disk recording/reproducing apparatus.

When initialized, the disk recording/reproducing apparatus performs a setup mode operation, as shown in the flow chart of FIG. 5. Thus, when the recording disk 1 is attached in position at step 101, the TOC information recorded in the lead-in region 7 of the disk 1 is read at the optical head 12 so as to be reproduced and stored in the TOC buffer memory 19. The apparatus then is in the stand-by mode.

Referring to the flow chart of FIG. 6, when the microcomputer 17 of the disk recording/reproducing apparatus is in the stand-by state, it is monitoring the actuating state of the actuating key 28 at the key input processor 40 for receiving the entry of the control data. If while in the stand-by state, the microcomputer 17 receives the actuating input of the PLAY key as the actuating key 28, at step 201 it starts the reproducing operation at step 202 to read the absolute address previously imparted to the recording disk 1 at step 203 to make reference at step 204 to the TOC information previously written in the above TOC buffer memory 19 by the above described setup mode operation shown in the flow chart of FIG. 5 to make a decision at step 205 whether or not the flag in the TOC information is "1".

When the result of the decision at step 205 is YES, that is, when the flag in the TOC information concerning the play information being reproduced is "1", a character indication of, for example, "LOCK" indicating that the currently reproduced play information is in the erasure inhibit state is lighted on the display screen of the display 29 at step 206. When the result of the decision at step 205 is NO, that is, when the flag in the TOC information concerning the currently reproduced play information is "0", the character indication of "LOCK" on the display screen of the display 29 is turned off at step 207. The micro-computer program then proceeds to the decision operation at step 208. At the decision operation of step 208, the actuating state of the LOCK/UNLOCK key instructing to inhibit the erasure of the currently reproduced play information or to instruct to cancel the erasure inhibition is determined. When the actuating input of the LOCK/UNLOCK key is received, i.e. the key is depressed, in the decision operation at step 208, it is decided at step 209 whether or not the flag in the TOC information concerning the current play information is "1". When the result of the decision is "YES", that is, when the erasure inhibition of the currently reproduced information is set, "0" is written at step 210 into the TOC buffer memory 19 as the flag for cancelling the erasure inhibition by way of flag resetting. Conversely, when the result of decision at step 200 is NO, that is, when the erasure inhibition of the currently reproduced play information is cancelled, "1" is written at step 211 into the TOC buffer memory 19 as the flag for setting the erasure inhibition by way of flag setting. When the actuating key of the LOCK/UNLOCK key is not received at step 208 or when the flag resetting at step 210 or the flag setting at step 211 is completed, the actuating state of the STOP key is monitored at step 212. When the actuating input of the STOP key is not received, the micro-computer program reverts to step 203 to continue the reproducing operation. Conversely, when the actuating input of the STOP key is received, the micro-computer program proceeds to complete the reproducing operation at step 213 and to resume the stand-by state.

It will be noted that, in the reproducing mode, when the actuating input of the LOCK/UNLOCK key is received in the course of the reproducing operation for the play information for the second tune, the flag of the TOC information for the tune "2" is set and the TOC information in the TOC buffer memory 19 is changed, as indicated in the following Table 2.

TABLE 2

| | Contents of TOC Information | | |
|---|---|---|---|
| tune Number | play start-time | play end time | flag |
| 1 | 00'00" | 05'00" | 0 |
| 2 | 08'00" | 13'00" | 1 |
| 3 | 15'03" | 20'00" | 0 |
| 4 | 28'00" | 36'00" | 0 |

Referring to the flow chart of FIG. 7, when the eject mode is commanded in the disk recording/reproducing apparatus as a result of actuation of the actuating key 28, the TOC information recorded in the TOC buffer memory 19 is recorded at step 301 in the lead-in region 7 of the recording disk 1 by the optical head 12. The eject operation is then performed at step 302 to terminate the operation.

Figure 8:
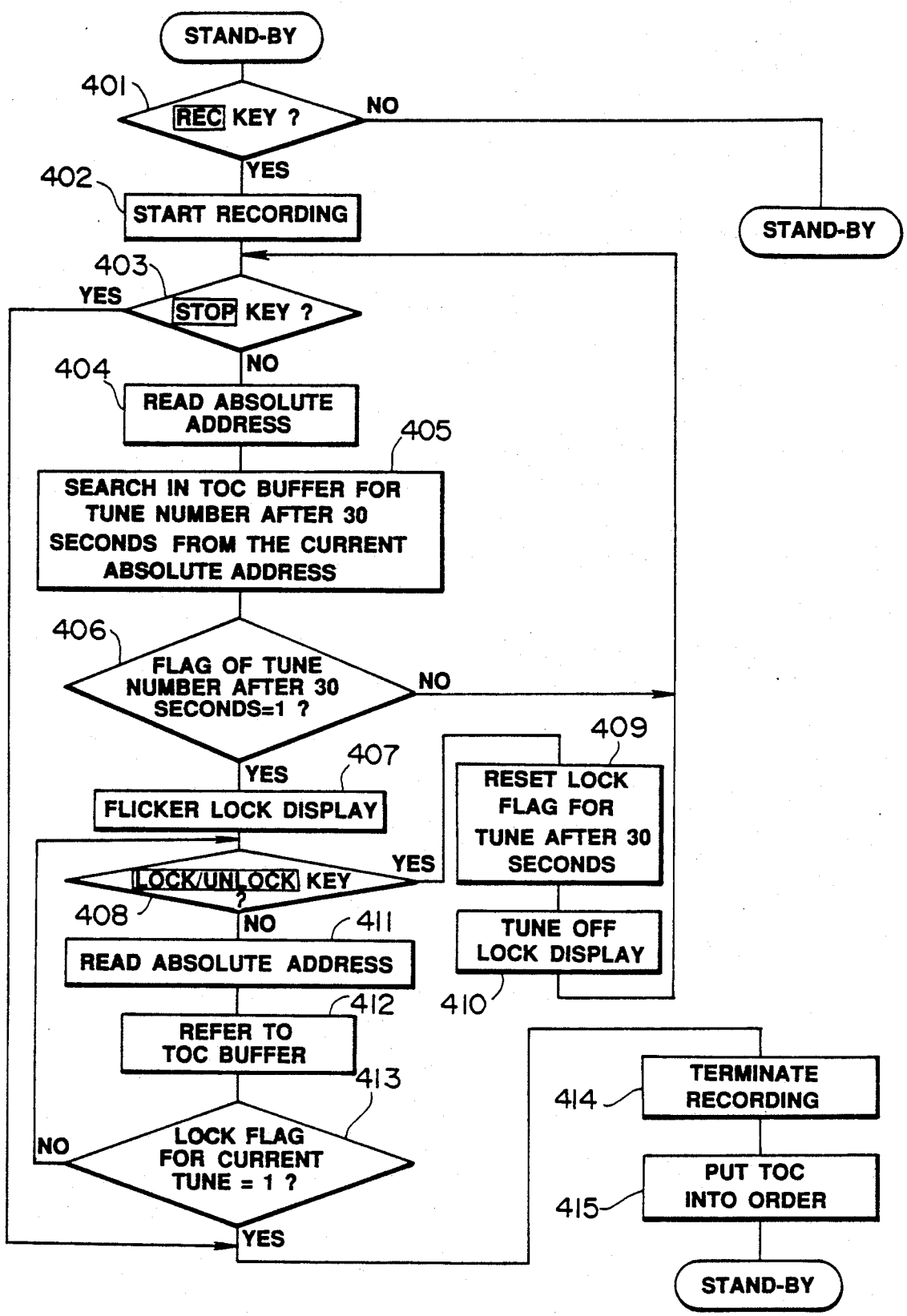
FIG. 8 is a flow chart showing the operation of the recording mode in the disk recording/reproducing apparatus.

In the present disk recording/reproducing apparatus, when a new play information is to be recorded on the recording disk 1, in the lead-in region of which the TOC information is already recorded as shown in Table 2, the micro-computer 17 receives a control input upon actuation of the actuating key 27, while it is in the stand-by state in which the TOC information is reproduced from the lead-in region 7 so as to be stored in the buffer memory 19, by the above described setup mode operation. The micro-computer then performs the operational control of the recording mode shown in the flow chart of FIG. 8 on the basis of the above TOC information.

More in detail, on reception of an actuating input of the REC key as the actuating key 28 at step 401, the microcomputer 17 starts the recording operation at step 402 and monitors the actuating state of the STOP key at step 403. When the actuating input of the STOP key is not received, the micro-computer reads at step 404 the absolute address imparted in advance to the recording disk 1, then makes a search at step 405 from the TOC information in the TOC buffer memory 19 for the tune number of the play information already recorded in the recording position which should be reached after 30 seconds from the current position indicated by this absolute address, and makes a decision at step 406 whether or not the flag of the TOC information for the tune number is "1". When the result of the decision at step 406 is NO, that is, when the erasure inhibit of the play information already recorded in the record position which should be reached after 30 seconds from the current position is not set, the microcomputer program reverts to step 403 to continue the recording operation. When the result of the decision at step 406 is NO, that is, when the erasure inhibit of the play information already recorded in the recording position which should be reached after 30 seconds from the current position is set, the micro-computer program reverts to step 407 to make a flickering display of a character such as "LOCK" indicating the erasure inhibit state on the display screen of the display 29. The micro-computer program then proceeds to step 408 to determine the actuating state of the LOCK/UNLOCK key.

On reception of the actuating input of the LOCK-/UNLOCK key, in the course of the decision operation at step 408, "0" is written in the TOC buffer memory 19 at step 409 as the flag for cancelling the erasure inhibit of the play information already recorded at the record position that should be reached after 30 seconds from the current position, by way of flag resetting. The indication of "LOCK" indicating the erasure inhibit state is turned off at step 410 on the display surface of the display 29. The microcomputer program then reverts to step 403 to continue the recording operation. When the actuating input of the LOCK/UNLOCK key is not received in the course of the decision operation at step 408, the micro-computer program reads at step 411 the absolute address imparted in advance to the recording disk 1 and makes reference at step 412 to the TOC information in the TOC buffer memory 19 to make a decision at step 413 whether or not the flag in the TOC information for the current tune number is "1". When the result of decision is NO, that is, when the erasure inhibit has been cancelled, the micro-computer program reverts to the decision operation at step 408 to continue the recording operation. When the result of the decision at step 413 is YES, that is, when a region is detected in which the erasure inhibit has been set, the recording operation is discontinued at step 414 just ahead of the erasure inhibit region. The TOC information in the TOC buffer memory 19 is then put into order at step 415. The apparatus is then at the stand-by state. It is noted that, when the operating input of the STOP key is received at step 403, the micro-computer program similarly proceeds to terminate the recording operation.

In the disk recording/reproducing apparatus of the present embodiment, when a new play information is to be recorded in the program region 6 of the recording disk 1 in the above described recording mode, the play information for the tunes each having the flag "0" in the TOC information recorded in the lead-in region 7, that is, the first, third and fourth tunes can be erased, so that so-called superscription recording can be made as desired. As for the play information for the second tune for which the flag in the TOC information is "1", that is, the erasure inhibit is set, the recording operation is automatically terminated directly before proceeding to the recording operation for the recording region for the second tune, unless the user positively operates the corresponding keys to cancel the erasure inhibition, so that there is no risk that the play information for the second tune be erased inadvertently. In addition, a flickering display of the letters "LOCK" is made on the display screen of the display 29 thirty seconds before the recording state is established on the record region of the second tune for which the erasure inhibition is set, in order to give a warning to the user of the approaching record inhibit region, so that the user is at a position to check the display surface of the display 29 to make a decision whether the erasure inhibit state is to be cancelled to continue the recording operation.

What is claimed is:

1. A disk recovering/reproducing apparatus in which a program region and a lead-in region are provided on a recording disk to which absolute addresses are imparted in advance, data such as play information are recorded in the program region, start address data and end address data of each unit information region in the program region having data recorded therein are recorded as catalog data in the lead-in region and in which recording and/or reproduction in or from the program region is performed on the basis of the catalog data in the lead-in region, wherein the improvement resides in that it comprises erasure inhibit control means for performing inhibit control of an erasure operation for data previously recorded in the program region on the recording disk, in that an erasure inhibit flag is provided on an information unit basis in the catalog data and in that an erasure inhibit control for data previously recorded in the program region on the recording disk is performed on an information unit basis by the erasure inhibit control means in response to the erasure inhibit flag.

2. The disk recording/reproducing apparatus according to claim 1 comprising memory means for storing the catalog information reproduced from the lead-in region of the recording disk, operating input means for switching the state of the erasure inhibit flag for an information unit of the catalog information in the memory means as the information unit is reproduced during reproduction of the program region on the recording disk, and catalog information rewriting means for re-recording the catalog information stored in the memory means in the lead-in region.

3. The disk recording/reproducing apparatus according to claim 1 wherein the erasure inhibit control means terminates the recording operation directly before the erasure inhibit region in the program region is reached during recording on the program region on the recording disk on the basis of the erasure inhibit flag for each information unit contained in the catalog information stored in the memory means.

4. The disk recording/reproducing apparatus according to claim 2 comprising display means for making a display indicating the approaching erasure inhibit region of the program region during recording on the program region on the recording disk on the basis of the erasure inhibit flag for each information unit contained in the catalog information stored in the memory means.

5. The disk recording/reproducing apparatus according to claim 4 comprising operating input means for cancelling the erasure inhibit of the information unit recorded in the erasure inhibit region of the program displayed by the display means during recording in the program region on the recording disk.

6. The disk recording/reproducing method in which a program region and a lead-in region are provided on a recordable disk to which absolute addresses are imparted in advance, data such as play information are recorded in the program region, start address data and end address data of a unit information region in the program region having data recorded therein are recorded as catalog data in the lead-in region and in which recording and/or reproduction in or from the program region is performed on the basis of the catalog data in the lead-in region, wherein the improvement resides in that it comprises setting an erasure inhibit flag for each data unit of data recorded in the program region on the recording disk as the catalog data, and performing erasure inhibit control for each information unit of data previously recorded in the program region in response to the erasure inhibit flag on the basis of the catalog data reproduced from the lead-in region on the recording disk.

7. The disk recording/reproducing method according to claim 6 wherein the catalog information reproduced from the lead-in region on the recording disk is stored and, when an operating input is received during reproduction of the program region of the recording disk, the catalog information in which the status of the erasure inhibit flag for the information unit being reproduced has been switched is re-recorded in the lead-in region.

8. The disk recording/reproducing method according to claim 7 wherein the recording operation is controlled on the basis of the erasure inhibit flag for each information unit contained in the catalog information reproduced from the lead-in region on the recording disk so that the recording operation is terminated directly before the erasure inhibit region of the program region is reached during recording in the program region on the recording disk.

9. The disk recording/reproducing method according to claim 8 wherein, when an operating input is received during recording in the program region on the recording disk, erasure inhibition of the information unit in the program region is cancelled to permit the recording operation to be continued.

* * * * *